(12) United States Patent  
Karschin et al.

(10) Patent No.: US 6,554,365 B2
(45) Date of Patent: Apr. 29, 2003

(54) MODULAR VEHICLE SEAT

(75) Inventors: Kurt Karschin, Kirchheim/Teck (DE); Peter Bertenburg, Elchingen (DE)

(73) Assignee: Recaro GmbH & Co. KG, Kirchheim/Teck (DE)

( * ) Notice: Subject to any disclaimer, the term of this patent is extended or adjusted under 35 U.S.C. 154(b) by 0 days.

(21) Appl. No.: 09/748,684

(22) Filed: Dec. 22, 2000

(65) Prior Publication Data

US 2001/0005095 A1 Jun. 28, 2001

(30) Foreign Application Priority Data

Dec. 23, 1999 (DE) ......................... 199 62 637
Sep. 21, 2000 (DE) ......................... 100 46 743

(51) Int. Cl.⁷ ............................................. A47C 7/00
(52) U.S. Cl. ............................. 297/440.14; 297/216.13
(58) Field of Search ..................... 297/216.13, 216.14, 297/DIG. 2, 452.18, 440.14, 230.1, 230.13, 230.14, 284.1, 284.3, 284.5

(56) References Cited

U.S. PATENT DOCUMENTS

| 1,734,179 | A | * | 11/1929 | Olson |
| 3,874,731 | A | * | 4/1975 | Jordan |
| 4,036,527 | A | * | 7/1977 | Faul |
| 4,065,182 | A | * | 12/1977 | Braniff et al. |
| 5,636,900 | A | * | 6/1997 | Wilkie et al. |
| 5,647,637 | A | * | 7/1997 | Jay et al. |
| 5,651,583 | A | * | 7/1997 | Klingler et al. |
| 6,059,370 | A | * | 5/2000 | Kanyer et al. |

FOREIGN PATENT DOCUMENTS

| DE | AS1055978 | * | 4/1959 |
| DE | AS1121944 | * | 1/1962 |
| DE | 3702262 | * | 8/1988 |
| DE | 4232679 | * | 7/1997 |

* cited by examiner

Primary Examiner—Milton Nelson, Jr.
(74) Attorney, Agent, or Firm—Alston & Bird LLP

(57) ABSTRACT

In a vehicle seat, in particular a motor vehicle seat, part of the seat structure has a frame which encloses a construction space within which a module for optionally receiving sub-assemblies is arranged.

19 Claims, 5 Drawing Sheets

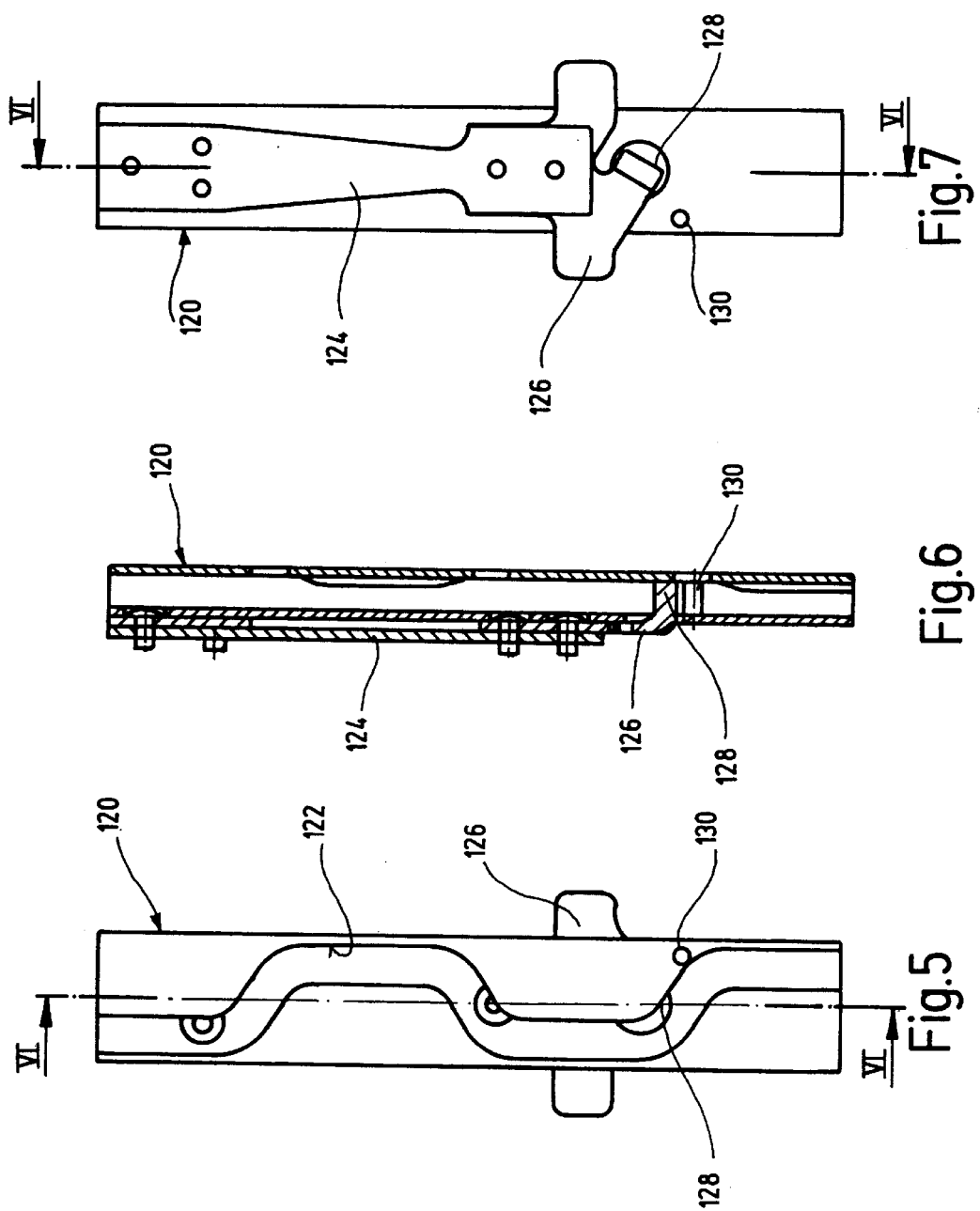

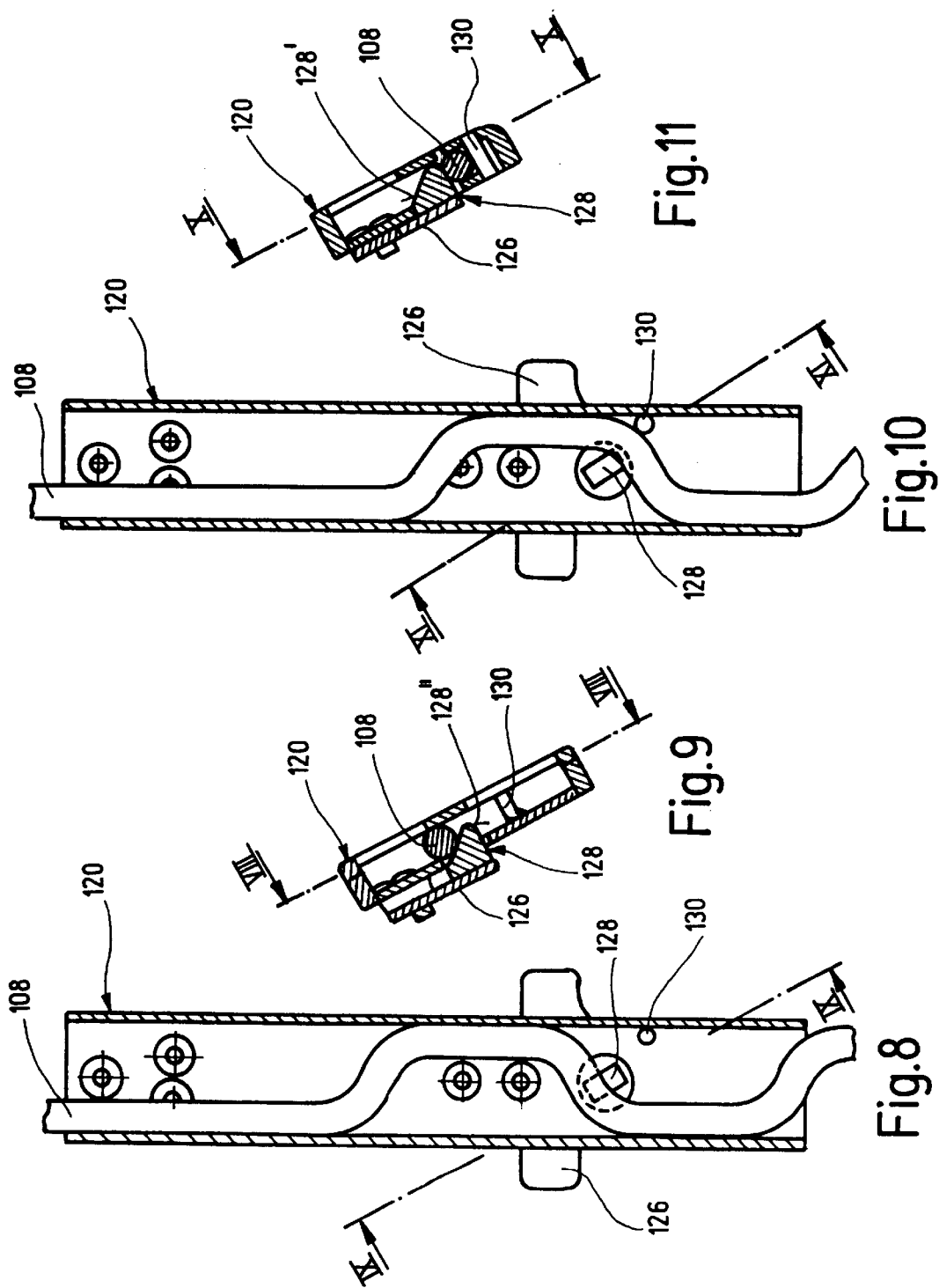

MODULAR VEHICLE SEAT

BACKGROUND OF THE INVENTION

The present invention relates to a vehicle seat and, in particular, to a motor vehicle seat having a modular design.

Vehicle seats are generally fitted into vehicles as accessory parts. In order for vehicle seats to be capable of being adapted to vehicles and safety devices, such as side airbag modules or seat belt tighteners, and to make the transport of vehicle seats for supply purposes cost-effective, it has been proposed to design vehicle seats in a modular manner. For example, a modular vehicle seat can consist of an adjustable substructure, a padded seat shell and a padded backrest. The parts of modular vehicle seats can each be mass produced and can be used in a plurality of vehicle types.

SUMMARY OF THE INVENTION

In accordance with one aspect of the present invention, the structure of an improved vehicle seat includes a frame that encloses a construction space, and a module is mounted to the frame and positioned within the construction space. The module is a structural component of the seat, is a separate component from the frame, and is for optionally receiving/capable of having one or more subassemblies mounted thereto.

Because the module for optionally receiving subassemblies is arranged within the construction space enclosed by the frame, the same frame can be additionally provided with different subassemblies without affecting or impairing the structural properties of the frame and the attaching of the cushion and/or of the cushion support to the frame. The frame can therefore be produced as a mass-produced part. The same module can also be used in a plurality of frames already on the market. The outlay in the case of an improved development, in particular on crash tests, is reduced, with the result that the production of the frame and therefore of the vehicle seat is more cost-effective. The subassemblies can be provided in accordance with the manufacturer's specifications or the individual wishes of the subsequent seat user, for example so as to improve the seat comfort.

The invention can be used in the backrest and/or in the seat part. In the case of a backrest, subassemblies which can be fitted to the module may, for example, be lordosis supports, side members, shoulder supports and/or seat-climate-control systems, which can in each case be fitted individually or in any desired combination, for which purpose the module preferably has various fastening elements.

So as not to alter the crash properties of the frame, the module is preferably fitted to and mounted to the frame by a connecting mechanism in such a manner that the material of the frame remains unweakened. More specifically and in order to be able to use the same module in different frames, it is advantageous if the module is fitted to the frame by means of adapters made to fit the frame, i.e. the adapter or adapters are generally frame-specific, whereas the module for different frames is preferably of identical design. These adapters can be designed in such a manner that they are able to absorb energy in the event of a crash, are deformed as a result or dissipate the energy in another manner.

A lock between the module and the adapter and/or between the adapter and the frame makes a rapidly closing connection possible, which reduces the production time. The lock can preferably also be released again in order to correct any installation errors.

So as not to alter the crash properties of the frame, the adapter is preferably fitted to the frame in such a manner that the material of the frame remains unweakened. For example, the adapter is preferably fitted in already existing openings of the frame in a form-fitting manner and/or using screw, rivet and/or plug-in connections, without welding connections to the frame. A design as a wire is advantageous here, with specially shaped sections and/or eyelets, nuts or other fastening elements preferably being welded to the wire.

In a preferred embodiment, at least one elongate section of the adapter is received by at least one hollow guide of the module, and side walls of the guide preferably hold the adapter section in at least two directions. A movable latching element preferably locks the adapter section and secures it in the third direction, optionally with respect to a stop. This lock is preferably activated following a relative displacement of the adapter section and guide in the longitudinal direction, for example by the latching element being spring-loaded and having a run-on slope over which the adapter section, after the relative displacement, moves the latching element, by bearing against the latter, counter to the spring load.

BRIEF DESCRIPTION OF THE DRAWINGS

In the following, the invention is explained in greater detail with reference to two exemplary embodiments illustrated in the drawings, in which:

FIG. 5 shows a view of a guide of the basic module of FIG. 3, from the side facing away from the basic module;

FIG. 6 shows a section through the guide along the line VI—VI in FIGS. 5 and 7;

FIG. 7 shows a view of the guide of FIG. 5, from the side facing the basic module;

FIG. 8 shows a section through the guide along the line VIII—VIII in FIG. 9;

FIG. 9 shows a section through the guide along the line IX—IX in FIG. 8;

FIG. 10 shows a section through the guide along the line X—X in FIG. 11; and

FIG. 11 shows a section through the guide along the line XI—XI in FIG. 10.

DETAILED DESCRIPTION OF THE INVENTION

Figure 1:
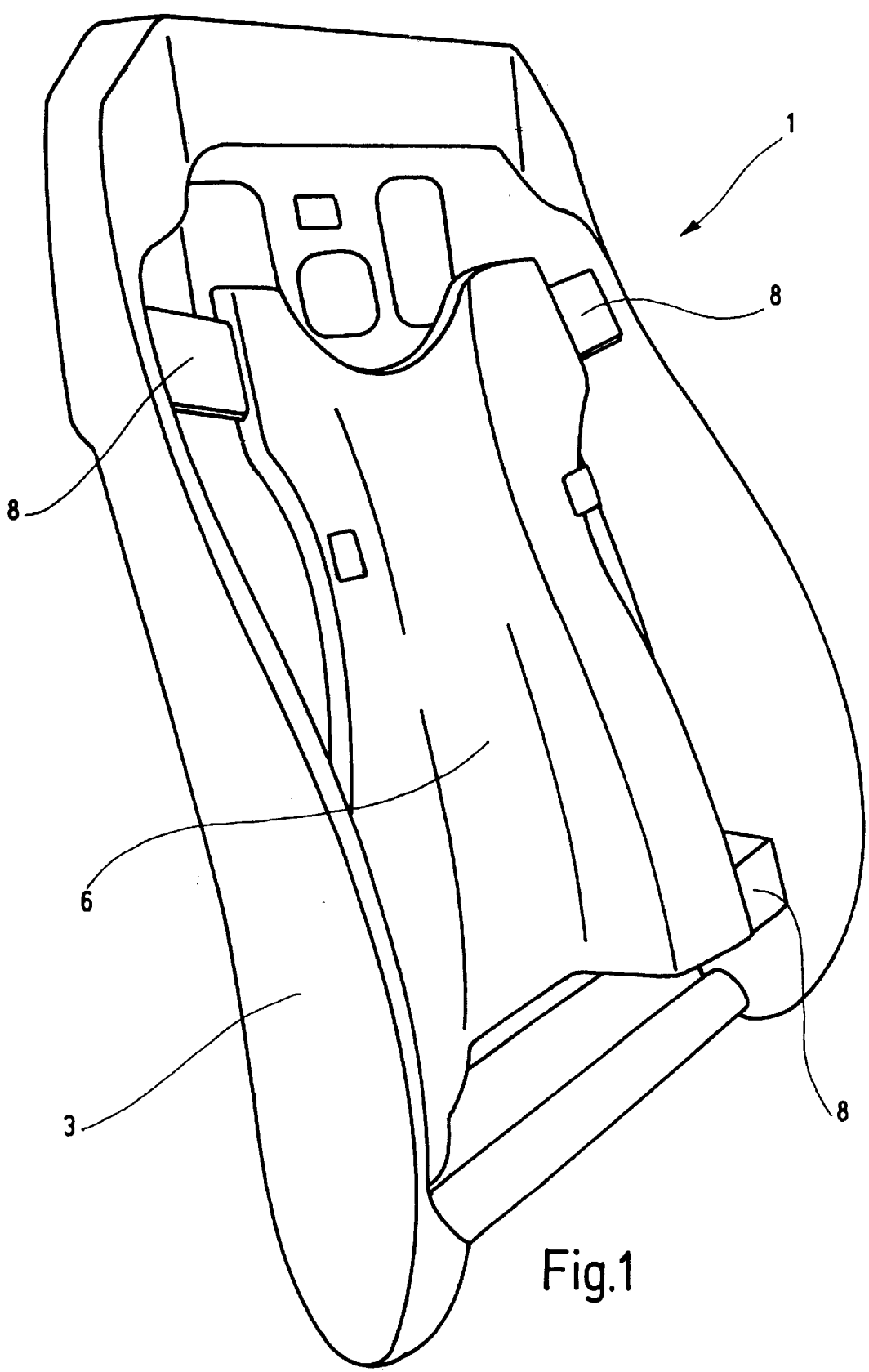
FIG. 1 shows a perspective view of a backrest structure having a basic module, in accordance with a first exemplary embodiment.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In the first exemplary embodiment, a backrest 1 of a vehicle seat, which is designed as a front seat of a motor vehicle, has a rigid backrest frame 3. The backrest frame 3 is configured with regard to the occurrence of a crash in such a manner that it can, by itself, absorb the forces acting on the backrest 1 and can, if appropriate, pass them on. The backrest frame 3 encloses a construction space within which a basic module 6 is arranged. The basic module 6 has a flat, virtually rectangular shape and is produced, for example, as an injection-molded plastic part or as a light-metal diecasting. The basic module 6 replaces a backrest plate optionally provided as an additional feature for the backrest frame 3.

An adapter 8, preferably made of sheet steel, is fastened to each of the four corners of the basic module 6. Each of the adapters 8, which can be, for example, angular, is also fastened to the backrest frame 3, for example by means of a screw or rivet connection. So as not to influence the crash properties of the backrest frame 3, the fastening options (holes, slots, beads or the like) present on the backrest frame 3 are used without weakening the material of the backrest frame 3 by further holes or the like. The adapters 8 are preferably designed in such a manner that they can absorb and dissipate energy, in particular by deformation, in the event of a crash, in particular in the event of a rearend crash.

Figure 2:
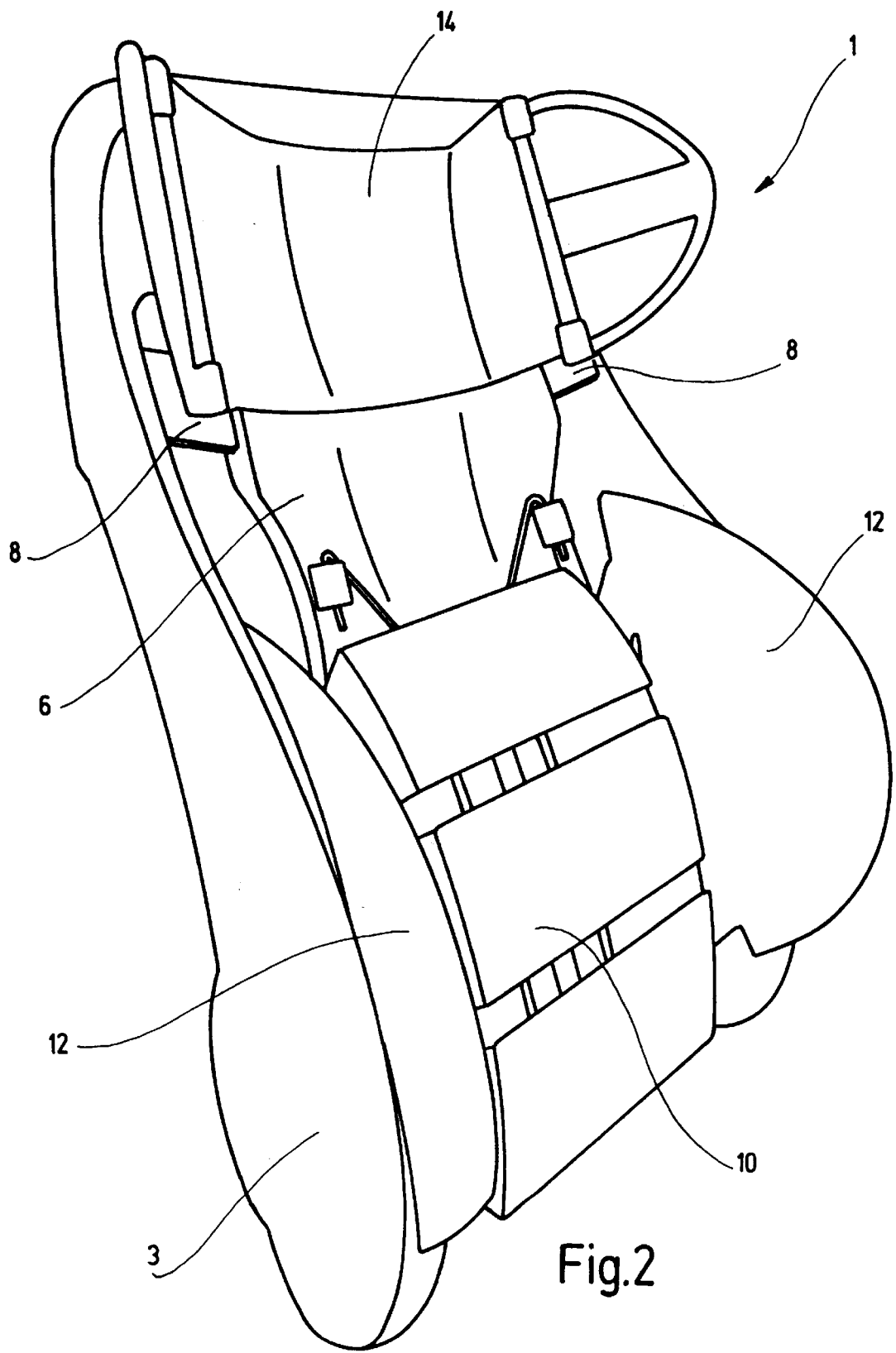
FIG. 2 shows an illustration as in FIG. 1, with various subassemblies being fitted to the basic module.
Figure 3:
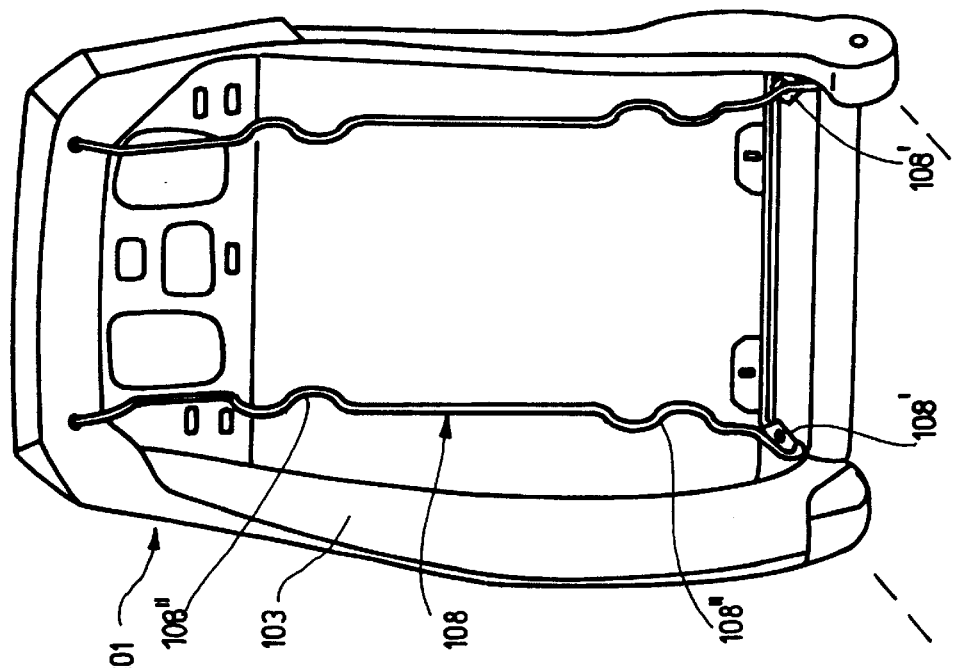
FIG. 3 shows a perspective rear view of the backrest structure having a basic module, in accordance with a second exemplary embodiment.
Figure 4:
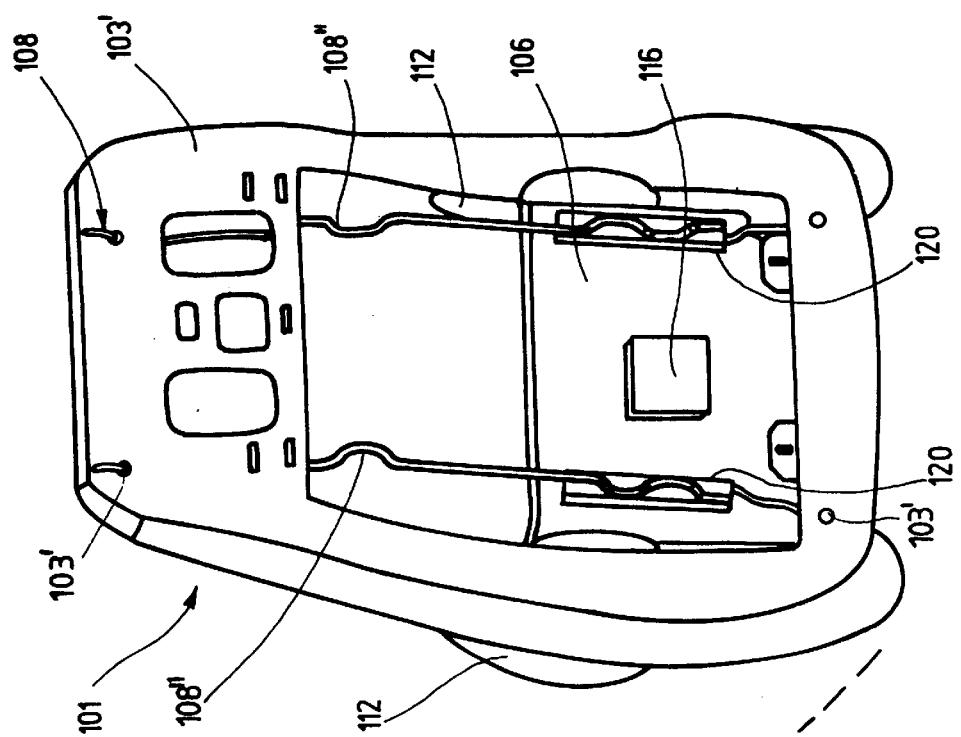
FIG. 4 shows a perspective front view of the backrest structure of FIG. 3 without the basic module.

A plurality of fastening elements are provided on the basic module 6. Referring to FIG. 2, various subassemblies, for example a (two-way or four-way) lordosis support 10, two side members 12 or lateral supporting brackets, a shoulder support 14 having lateral members, a ventilator for seat temperature control or a seat-climate-control system, can be fitted to these fastening elements. The subassemblies, such as those mentioned in the prior sentence, can be fastened to the basic module 6 individually or in combination. Examples of fastening elements provided for this purpose are smooth holes, threaded holes or tubular or tab-like hookout devices for fitting brackets in.

On the side facing the seat user the backrest frame 3 having the basic module 6 together with all the fitted subassemblies is provided with padding. This padded backrest structure is then covered by a common covering consisting of subsections sewn together.

The second exemplary embodiment that is illustrated in FIGS. 3–10 is identical in many respects to the first exemplary embodiment, and components which are identical and act in an identical manner bear reference numbers higher by 100. A backrest 101 of a vehicle seat, which is designed, for example, as a front seat of a motor vehicle, has a rigid backrest frame 103. As regards the directional information, the starting point in the following is a virtually vertical alignment of the backrest frame 103 (z direction) with a customary arrangement of the vehicle seat in the direction of travel (x direction). The backrest frame 103, which is of commercially available design, is configured with regard to the occurrence of a crash in such a manner that it can absorb by itself the forces acting on the backrest 101 and, if appropriate, pass them on.

In the construction space defined by the backrest frame 103, i.e. in the y-z plane, an adapter wire 108 which is upwardly open and is bent approximately in a U-shape is arranged for the fitting of a basic module 106 (described below). Welded on in the resultant corner sections of the adapter wire 108 are nuts 108' which are screwed firmly to the backrest frame 103 in the region of the lower corners of the backrest frame 103 by means of openings 103' which are present there. The two end sections of the adapter wire 108 are inserted from the front through further, already existing openings 103' in the region of the upper corners of the backrest frame 103 and are bent over on the rear side of the backrest frame 103. The adapter wire 108, which is made to fit the frame, is connected by these various measures in a form-fitting manner to the backrest frame 103 without weakening the material thereof.

The adapter wire 108 has two wavy sections 108" on each of its two limbs, which run approximately vertically. In each wavy section 108", the adapter wire 108 is bent once laterally outward and then once laterally inward with a small swing in each half-wave. These wavy sections 108" enable the adapter wire 108 to, among other things, absorb and dissipate energy in the event of a crash. However, the wavy sections 108" primarily serve for the fastening of the basic module 106. This basic module 106, which optionally replaces a backrest plate, serves in turn for the fastening of various subassemblies, for example a (two-way or four-way) lordosis support, two side members 112 or two lateral supporting brackets, a shoulder support having lateral members, a ventilator 116 for seat temperature control or a seat-climate-control system. The subassemblies can be fastened to the basic module 106 individually or in combination using suitable fastening elements.

The basic module 106, which is arranged within the plane defined by the backrest frame 103, has two guides 120 on its side facing rearward. The guides 120 are arranged parallel to the limbs of the adapter wire 108. The limbs run approximately vertically (z direction), and at equal spacing in the transverse direction (y direction). Each guide 120 is designed as an elongate hollow box, as a result of which the side walls and an internal space are defined. In the side wall facing away from the basic module 106 the guide 120 has a wave-shaped recess 122. The wave-shaped recess 122 corresponds in its shape to the wavy sections 108" of the adapter wire 108.

On the side wall facing the basic module 106, a leaf spring 124 is fitted on the outside of the upper end of the guide 120. The leaf spring 124 is preferably riveted to a plate welded onto the guide 120. Riveted to the lower end of the leaf spring 124 is a latching-lug plate 126. The latching-lug plate 126 protrudes laterally a short distance over the guide 120 and, by means of an integrally formed latching lug 128, protrudes in the x direction approximately centrally into the internal space of the guide 120. A stop 130 in the form of a bolt is arranged in the x direction in the internal space of the guide 120 at a distance of the diameter of the adapter wire 108 from the latching lug 128.

In order to install the backrest 101, after the adapter wire 108 has been fastened to the backrest frame 103, the basic module 106 is placed from the front (counter to the x direction) onto the adapter wire 108 in such a manner that the wavy recesses 122 of the two guides 120 are aligned on each wavy section 108". Further movement of the basic module 106 counter to the x direction causes the wavy sections 108" to move into the internal space of the particular guide 120. The particular latching lug 128 is arranged here in the region of the lower half-wave of the wavy section 108". The basic module 106 is then pushed upward (in the z direction), as a result of which the wavy section 108" and the wave-shaped recess 122 no longer cover each other.

Each of the latching lugs 128, each of which has a run-on slope 128', finally passes to bear with this run-on slope 128' against the adapter wire 108, specifically in the region of the center of the particular wavy section 108". Further movement of the basic module 106 causes the latching lug 128 first of all to move over the run-on slope 128' out of the internal space of the guide 120 counter to the force of the leaf spring 124 (in the x direction), as is illustrated in FIGS. 8 and 9, and after being guided past the other side of the adapter wire 108 to be pressed back into the internal space by the force of the leaf spring 124. The adapter wire 108 now bears on one side against a latching surface 128" of the latching lug 128, which surface runs perpendicularly with respect to the guide (in the x direction), and on the other side bears against the stop 130. The latched-in adapter wire 108 and the guide 120 (and therefore the basic module 106) are now locked to one another, as is illustrated in FIGS. 10 and 11. In this case, the side walls of the guide 120 ensure the necessary retention in the x direction and y direction, while the latching lug 128 and the stop 130 secure them in the z direction.

Should an error be noticed during installation, the latching lug 128 can then be pulled again out of the internal space of the guide 120 manually by pressing on the latching-lug plate 126. The basic module 106 can then be moved relative to the adapter wire 108 again and can be removed again from the latter with the reverse sequence of the described installation steps. In the completely fitted state, the backrest frame 103 having the basic module 106 together with the subassemblies fitted is provided with padding on the side facing the seat user. This padded backrest structure is then covered by a common covering which consists of subsections sewn together.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle seat, comprising:
   a frame that encloses a construction space;
   a module positioned in the construction space, wherein the module is a structural component of the seat, is a separate component from the frame, and is capable of having one or more subassemblies mounted thereto; and
   a connecting mechanism mounting the module to the frame in such a manner that the material of the frame remains unweakened, with the connecting mechanism including at least one adapter that is made to fit the frame, and the module is fitted to the frame by the adapter, wherein the adapter includes a wire mounted to the frame, and the connecting mechanism includes a locking mechanism connecting the module to the adapter, and wherein fastening elements are attached to the adapter and the adapter is connected to the frame by fasteners that engage the fastening elements.

2. The vehicle seat as claimed in claim 1, wherein the wire extends across the construction space.

3. The vehicle seat as claimed in claim 1, further comprising a subassembly mounted to the module, wherein the subassembly is selected from the group consisting of a lordosis support, side members, a ventilator, and a shoulder support.

4. The vehicle seat as claimed in claim 1, wherein the adapter is for absorbing and dissipating energy in the event of a crash.

5. The vehicle seat as claimed in claim 1, wherein the frame is a backrest frame that defines a plane, and the module is within the plane defined by the backrest frame.

6. The vehicle seat as claimed in claim 1, wherein the module is substantially flat and rectangular.

7. A vehicle seat, comprising:
   a frame that encloses a construction space;
   a module positioned in the construction space, wherein the module is a structural component of the seat, is a separate component from the frame, and is capable of having one or more subassemblies mounted thereto; and
   a connecting mechanism mounting the module to the frame in such a manner that the material of the frame remains unweakened,
   wherein the connecting mechanism includes at least one adapter that is made to fit the frame, and the module is fitted to the frame by the adapter,
   wherein the adaptor includes a wire mounted to the frame,
   wherein the connecting mechanism includes a locking mechanism connecting the module to the adapter, and
   wherein fastening elements are attached to the wire and the wire is connected to the frame by fasteners that engage the fastening elements and extend into existing openings in the frame.

8. The vehicle seat as claimed in claim 7, further comprising a subassembly mounted to the module, wherein the subassembly is selected from the group consisting of a lordosis support, side members, a ventilator, and a shoulder support.

9. A vehicle seat, comprising:
   a frame that encloses a construction space;
   a module positioned in the construction space, wherein the module is a structural component of the seat, is a separate component from the frame, and is capable of having one or more subassemblies mounted thereto; and
   a connecting mechanism mounting the module to the frame in such a manner that the material of the frame remains unweakened,
   wherein the connecting mechanism includes at least one adapter that is made to fit the frame, and the module is fitted to the frame by the adapter,
   wherein the adapter includes a wire mounted to the frame and the wire is connected to the frame by virtue of the wire extending through openings in the frame, and
   wherein the connecting mechanism includes a locking mechanism connecting the module to the adapter.

10. The vehicle seat as claimed in claim 9, further comprising a subassembly mounted to the module, wherein the subassembly is selected from the group consisting of a lordosis support, side members, a ventilator, and a shoulder support.

11. A vehicle seat, comprising:
    a frame that encloses a construction space;
    a module positioned in the construction space, wherein the module is a structural component of the seat, is a separate component from the frame, and is capable of having one or more subassemblies mounted thereto; and
    a connecting mechanism mounting the module to the frame, wherein the connecting mechanism mounts the module to the frame in such a manner that the material of the frame remains unweakened, and wherein the connecting mechanism includes at least one adapter that is made to fit the frame, and the module is fitted to the frame by the adapter, wherein the module includes at least one hollow guide and the adapter has at least one elongate section which is received by the hollow guide so that the module is locked to the adapter.

12. The vehicle seat as claimed in claim 11, wherein the guide includes side walls that hold the elongate section of the adapter in at least two directions.

13. The vehicle seat as claimed in claim 11, further comprising a movable latching element positioned within the guide for locking the elongate section of the adapter within the guide.

14. The vehicle seat as claimed in claim 13, wherein the adapter is a wire, the guide includes side walls that hold the elongate section of the wire in at least two directions, the guide defines a wave-shaped recess, and the elongate section of the wire has a wavy shape that corresponds in shape to the wave-shaped recess and is received by the wave-shaped recess.

15. The vehicle seat as claimed in claim 11, wherein the connecting mechanism includes a locking mechanism connecting the adapter to the frame.

16. The vehicle seat as claimed in claim 11, wherein a side wall of the guide includes a wave-shaped recess and the elongate section of the adapter has a wavy shape that corresponds in shape to the wave-shaped recess and is received by the wave-shaped recess.

17. The vehicle seat as claimed in claim 11, further comprising a subassembly mounted to the module, wherein the subassembly is selected from the group consisting of a lordosis support, side members, a ventilator, and a shoulder support.

18. A vehicle seat, comprising:

a frame that encloses a construction space;

a module positioned in the construction space, wherein the module is a structural component of the seat, is a separate component from the frame, and is capable of having one or more subassemblies mounted thereto, and wherein the module is manufactured using a technique selected from the group consisting of injection-molding and diecasting; and a connecting mechanism mounting the module to the frame in such a manner that the material of the frame remains unweakened, with the connecting mechanism including at least one adapter that is made to fit the frame, and the module is fitted to the frame by the adapter, wherein the connecting mechanism includes a locking mechanism connecting the module to the adapter, and wherein fastening elements are attached to the adapter and the adapter is connected to the frame by fasteners that engage the fastening elements.

19. The vehicle seat as claimed in claim 18, wherein the adapter includes a wire mounted to the frame.

* * * * *